(12) United States Patent
Tadachi et al.

(10) Patent No.: US 10,367,954 B2
(45) Date of Patent: Jul. 30, 2019

(54) INFORMATION PROCESSOR AND STORAGE MEDIUM STORING CONVERSION METHOD SETTING PROGRAM FOR CONVERTING USER READ INFORMATION IN ACCORDANCE WITH SELECTED CONVERSION METHOD

(71) Applicant: SEIKO EPSON CORPORATION, Tokyo (JP)

(72) Inventors: Kazuki Tadachi, Matsumoto (JP); Takeshi Yamada, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 20 days.

(21) Appl. No.: 15/846,607

(22) Filed: Dec. 19, 2017

(65) Prior Publication Data

US 2018/0205840 A1 Jul. 19, 2018

(30) Foreign Application Priority Data

Jan. 18, 2017 (JP) ................................. 2017-006464

(51) Int. Cl.
*G06F 3/12* (2006.01)
*H04N 1/00* (2006.01)
*G06F 21/34* (2013.01)

(52) U.S. Cl.
CPC ....... *H04N 1/00342* (2013.01); *G06F 3/1205* (2013.01); *G06F 3/1206* (2013.01); *G06F 21/34* (2013.01); *H04N 1/00875* (2013.01); *G06F 3/1209* (2013.01); *G06F 3/1222* (2013.01); *G06F 3/1238* (2013.01); *G06F 3/1245* (2013.01); *G06F 3/1288* (2013.01); *H04N 1/00148* (2013.01); *H04N 2201/0094* (2013.01)

(58) Field of Classification Search
None
See application file for complete search history.

(56) References Cited

U.S. PATENT DOCUMENTS

2011/0228311 A1 9/2011 Oguma

FOREIGN PATENT DOCUMENTS

JP 2011-193308 9/2011

*Primary Examiner* — Benny A Tieu
*Assistant Examiner* — Haris Sabah
(74) *Attorney, Agent, or Firm* — Workman Nydegger

(57) ABSTRACT

An information processor includes a read information obtaining unit, a conversion unit, an authentication information obtaining unit, and a conversion method setting unit. The read information obtaining unit obtains read information read from an authentication medium by a reading device. The conversion unit converts the read information in accordance with a predetermined conversion method. The authentication information obtaining unit obtains comparative-purpose authentication information to be used for a comparison with the converted read information. The conversion method setting unit sets, when the converted read information and the comparative-purpose authentication information match each other, the conversion method as a particular conversion method used to convert the read information read by the reading device.

4 Claims, 4 Drawing Sheets

| PRINTER | CONVERSION METHOD |
|---|---|
| PRINTER 40a | CONVERSION METHOD A |
| PRINTER 40b | CONVERSION METHOD A |
| PRINTER 40c | CONVERSION METHOD B |
| ⋮ | ⋮ |

INFORMATION PROCESSOR AND STORAGE MEDIUM STORING CONVERSION METHOD SETTING PROGRAM FOR CONVERTING USER READ INFORMATION IN ACCORDANCE WITH SELECTED CONVERSION METHOD

BACKGROUND

1. Technical Field

The present invention relates to an information processor capable of authenticating a user and to a storage medium storing a program used by the information processor.

2. Related Art

When a user intends to use a device such as a printer, the user may allow a card reader (reading device) to read an authentication medium such as an integrated circuit (IC) card possessed by the user so that the device is able to confirm whether the user is a pre-registered user (i.e., perform user authentication) based on read information obtained through the reading. Since the format of the read information output from the card reader differs depending on a type of the card reader, it has therefore been required that the format of the read information be converted to the format required for authentication.

There has been disclosed a system in which a multifunction machine sends, to a server device, data read from an ID card by a reader, together with data format information, and the server device identifies the data format of the received read data in accordance with the data format information, converts the data format into a predetermined data format, identifies a user ID corresponding to the read data, and authenticates a user based on the user ID (see JP-A-2011-93308).

Since the format of read information to be output from a card reader varies, and when the format of read information is unknown, information required for authentication may not be correctly obtained from the read information. In JP-A-2011-93308, a user cannot be properly authenticated if data format information cannot be identified by a multifunction machine.

SUMMARY

An advantage of some aspects of the invention is to provide an information processor and a storage medium storing a conversion method setting program that are capable of appropriately setting a conversion method in order to obtain information required for user authentication, even in a situation where various formats exist.

An information processor according to an aspect of the invention includes a read information obtaining unit, a conversion unit, an authentication information obtaining unit, and a conversion method setting unit. The read information obtaining unit obtains read information read from an authentication medium by a reading device. The conversion unit converts the read information in accordance with a predetermined conversion method. The authentication information obtaining unit obtains comparative-purpose authentication information that is used for a comparison with the converted read information. The conversion method setting unit sets, when the converted read information and the comparative-purpose authentication information match each other, the conversion method as a particular conversion method used to convert the read information read by the reading device.

According to this configuration, when information that is converted, in accordance with the conversion method, from read information read from an authentication medium by the reading device and comparative-purpose authentication information match each other, the information processor sets this conversion method as a particular conversion method to be used to convert read information read by the reading device. Even if the format of obtained read information is unknown, information required for user authentication can be appropriately obtained from the read information by using the particular conversion method.

The authentication information obtaining unit may regard authentication information associated with a specified user as the comparative-purpose authentication information.

According to this configuration, a particular conversion method can be effectively set by allowing the reading device to read an authentication medium possessed by a specified user and by comparing information converted from read information with comparative-purpose authentication information (the authentication information associated with the specified user).

The conversion unit may convert the read information in accordance with each of a plurality of conversion methods, and the conversion method setting unit may select and set, as the particular conversion method, one of the plurality of conversion methods with which the converted read information and the comparative-purpose authentication information match each other.

According to this configuration, from among a plurality of conversion methods, a particular conversion method capable of converting read information into information required for user authentication can be selected and set.

The information processor may further include a display controller and a selection accepting unit. The display controller causes a predetermined display unit to display conversion methods with which the converted read information and the comparative-purpose authentication information match each other. The selection accepting unit accepts a selection from among the displayed conversion methods. The conversion method setting unit may also set the selected conversion method as the particular conversion method.

According to this configuration, for example, even when there are a plurality of conversion methods satisfying a condition that specifies a particular conversion method, a user can be prompted to select a particular conversion method.

When there are a plurality of conversion methods that may each be a candidate for the particular conversion method with which the converted read information and the comparative-purpose authentication information match each other, the conversion unit may convert read information newly obtained by the read information obtaining unit in accordance with each of a plurality of candidate conversion methods, the authentication information obtaining unit may obtain new comparative-purpose authentication information, and, by determining if information converted from the read information newly obtained and the new comparative-purpose authentication information match each other, the conversion method setting unit identifies the particular conversion method from among the plurality of candidate conversion methods.

According to this configuration, even when there are a plurality of conversion methods that may each be a candidate for a particular conversion method, an appropriate conversion method selected from among the plurality of conversion methods can be set as the particular conversion method.

The technical ideas of the invention can be realized through various aspects in addition to a category of information processors. For example, an invention of a method corresponding to a process executed by an information processor, an invention of a program (conversion method setting program) that causes hardware (computer) to execute the process, and an invention of a computer readable storage medium in which the program is stored can be established. A system including an information processor and other devices can also be established as an invention.

BRIEF DESCRIPTION OF THE DRAWINGS

The invention will be described with reference to the accompanying drawings, wherein like numbers reference like elements.

DESCRIPTION OF EXEMPLARY EMBODIMENTS

An embodiment of the invention will be described herein with reference to the drawings. Note that the drawings are merely examples used to illustrate the embodiment.

1. SYSTEM OVERVIEW

Figure 1:
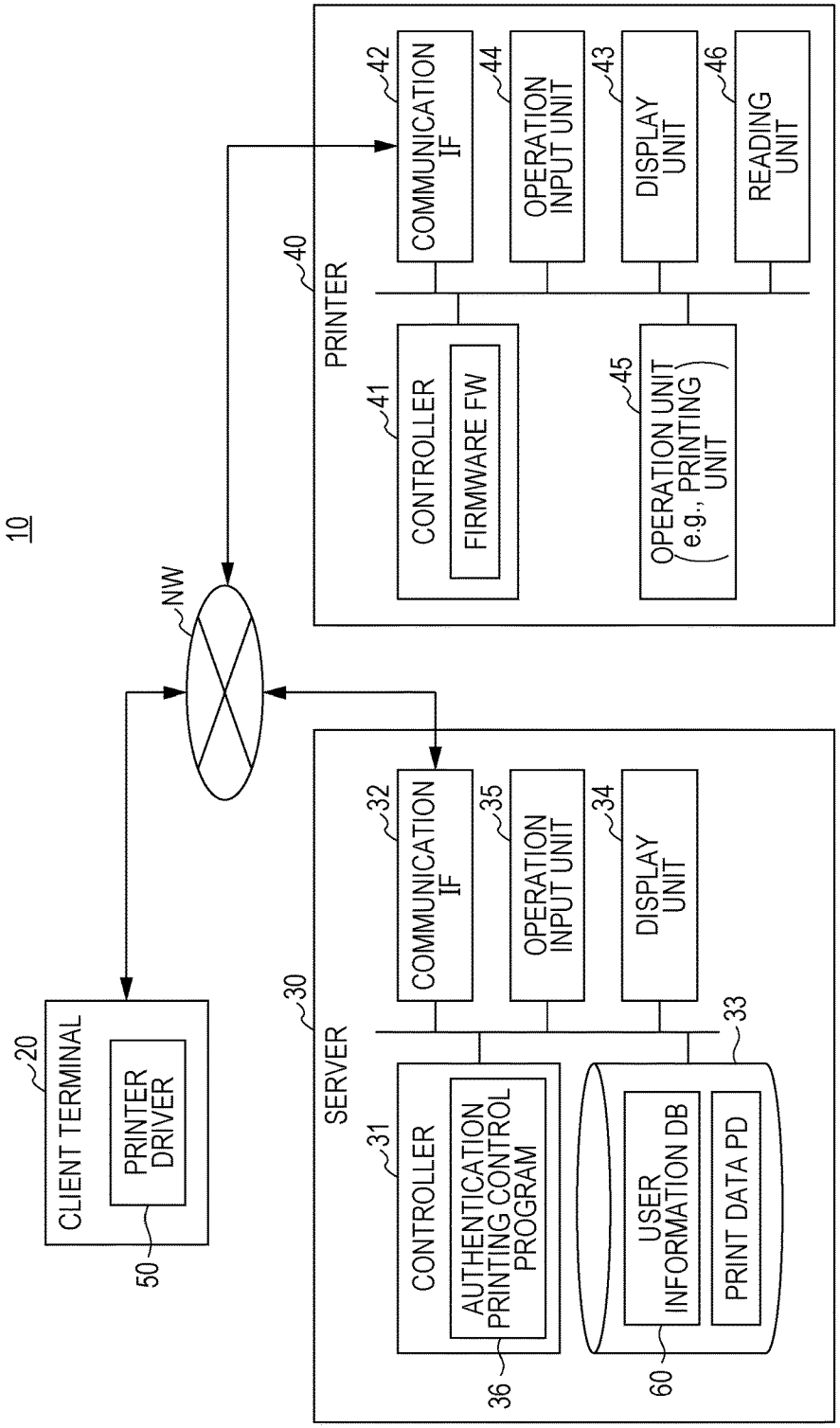
FIG. 1 illustrates a schematic configuration of a system.

FIG. 1 schematically illustrates a system 10 according to the embodiment. The system 10 includes a client terminal 20 and a server 30. The system 10 further includes a printer 40 as a kind of a device that is subject to control by the server 30. The printer 40 is a device configured to at least function as a printer and may be a multifunction machine incorporating a plurality of functions, such as scanner and facsimile functions. The devices assumed by this embodiment are not limited to printers, but may be various devices that require user authentication when a user intends to use such a device. The entirety or a part of the system 10 may be referred to as an authentication printing system. The server 30 is a server configured to control and manage the authentication printing system and thus may be referred to as an authentication printing control server, for example. The server 30 corresponds to a specific example of an information processor according to an aspect of the invention.

The client terminal 20, the server 30, and the printer 40 each have a network communication function and are both capable of communicating with each other via a network NW. Examples of the network NW include a local area network (LAN) and the Internet. The network NW may be a wired network or a wireless network. FIG. 1 illustrates one client terminal 20 and one printer 40. However, plural client terminals 20 and plural printers 40 may be present. When plural systems 10 are present, plural servers 30 are accordingly present.

The client terminal 20 can be implemented by using, for example, a personal computer (PC), a smart phone, a tablet terminal, a cellular phone, or a terminal having similar functionality. In the client terminal 20, a printer driver 50 is installed as a kind of a program. The printer driver 50 is a driver (device driver) that controls the printer 40. The client terminal 20 can download and install the printer driver 50 from the server 30 via the network NW, for example.

The server 30 is configured to include a controller 31, a communication interface (IF) 32, a storage unit 33, a display unit 34, and an operation input unit 35, for example. The server 30 is implemented by using one or more information processing apparatuses, which function as a server. The controller 31 is configured to include an IC having a central processing unit (CPU), a read-only memory (ROM), and a random access memory (RAM), for example, and other types of memory, for example. In the controller 31, the CPU performs arithmetic processing in accordance with a program stored in the ROM, for example, by using the RAM, for example, which serves as a work area to control functioning of the server 30 and the printer 40. In the controller 31, an authentication printing control program 36 is installed as such a program. At least a part of a function of the authentication printing control program 36 corresponds to a conversion method setting program according to an aspect of the invention. The authentication printing control program 36 may therefore be referred to as a conversion method setting program.

The communication IF 32 is an IF configured to enable external communication via the network NW in accordance with predetermined communication standards including a known communication standard. The storage unit 33 is configured to include a storage device, such as a hard disc drive or a flash memory. The storage unit 33 is also a part of the controller 31. In the storage unit 33, a user information database (DB) 60 is stored, for example. Also in the storage unit 33, print data PD to be generated by the printer driver 50 will temporarily be stored.

The display unit 34 is a display that displays visual information and is formed of, for example, a liquid crystal display (LCD) or an organic electroluminescence display. The display unit 34 may be configured to include a display and a driving circuit configured to drive the display. The operation input unit 35 is an operation entry unit used by a user to enter an operation and is implemented, for example, by using a touch panel, physical buttons, a mouse, or a keyboard. The display unit 34 can also function as such a touch panel. The display unit 34 and the operation input unit 35 may be external peripheral devices of the server 30.

The printer 40 is configured to include a controller 41, a communication IF 42, a display unit 43, an operation input unit 44, an operation unit 45, and a reading unit 46, for example. The controller 41 is configured to include an IC having a CPU, a ROM, and a RAM, for example, and other types of memory, for example. In the controller 41, the CPU performs arithmetic processing in accordance with firmware FW stored in the ROM, for example, by using the RAM, for example, which serves as a work area to control functioning of units, in addition to the operation unit 45, of the printer 40. For basic descriptions of the communication IF 42, the display unit 43, and the operation input unit 44, the descriptions with respect to the communication IF 32, the display unit 34, and the operation input unit 35 can be applied. The display unit 43 and the operation input unit 44 may collectively be referred to as an operation panel for the printer 40.

The term "operation unit 45" denotes an operation unit configured to specifically achieve various functions that the printer 40 (a multifunction machine) can include, such as, in addition to the printing unit configured to perform a printing operation based on print data PD, a scanner unit configured to generate image data by optically reading a document, a facsimile communication unit capable of performing facsimile communications (sending and receiving documents), and an e-mail communication unit capable of performing e-mail communications (sending and receiving e-mails). Detailed descriptions of the configurations of the printing unit, the scanner unit, the facsimile communication unit, and the e-mail communication unit, for example, are already known and are thus omitted.

2. DESCRIPTION OF AUTHENTICATION PRINTING

An example flow of authentication printing using an authentication printing system will now be briefly described herein. A user operates the client terminal 20, for example, enters their predetermined user identification information (information unique to each user in the authentication printing system, hereinafter referred to as a user ID), logs on to the client terminal 20 via the operating system (OS), and starts the printer driver 50. The printer driver 50 (i.e., a controller of the client terminal 20 configured to implement the printer driver 50) performs predetermined imaging processing and conversion processing on a desired print-target image specified by the user who has logged on (logged-on user) to generate print data PD. The printer driver 50 sends the generated print data PD from the client terminal 20, via the network NW, to the server 30. Print data PD is, for example, raster data representing a print-target image.

Print data PD is added with a user ID of a logged-on user and print setting information describing print settings accepted by the printer driver 50 through operation of the client terminal 20. Print settings refer to settings for various printing conditions, such as paper size, scale (magnification ratio), color or monochrome printing, duplex or simplex printing, margins, and quantity. Information including print data PD, the user ID, and print setting information, for example, may be referred to as the print job. On the server 30, the controller 31 stores, in the storage unit 33, print data PD (print job) received from the communication IF 32 via the network NW. In the user information DB 60 in the storage unit 33, user information about each user is registered beforehand. The user information includes a user ID, a user name (e.g., a name), and other personal information (e.g., an e-mail address). A user having user information registered in the user information DB 60 is referred to as a registered user. Upon receiving externally print data PD tagged with a user ID that matches a user ID of a registered user, the controller 31 stores the print data PD in the storage unit 33.

The user enters their user ID into the printer 40. In this embodiment, the reading unit 46 (reading device) is used to enter a user ID into the printer 40. The reading unit 46 is a card reader, for example. The reading unit 46 is an external reader attached to the printer 40. More specifically, the printer 40 is provided with a port used to couple a peripheral device, and the port is coupled with a reader, i.e., the reading unit 46, selected from among various kinds of commercially available readers. The user possesses an authentication medium such as an IC card in which their user ID is electronically stored to, and presents the authentication medium to or near the reading unit 46 to enter their user ID into the printer 40. The controller 41 of the printer 40 that has accepted the user ID entered via the reading unit 46 sends an authentication request with the entered user ID to the server 30 via the network NW.

In the server 30 that has received the authentication request, the controller 31 executes the authentication printing control program 36 to control authentication printing as described below. The controller 31 first converts a data format of the user ID included in the received authentication request by using a conversion method already set in association with the printer 40 that has sent the authentication request. A process of setting a conversion method will be described later (see FIGS. 2 to 5).

When a user ID obtained after the format is converted as described above and a user ID of a registered user match each other, the controller 31 accepts the authentication request (successful authentication). The user who has allowed the reading unit 46 to read the authentication medium is now authenticated by the server 30 as a user (registered user) who has been granted permission to use the printer 40 of the authentication printing system. The controller 31 confirms if print data PD is stored in the storage unit 33 together with the user ID of the authenticated user. When such print data PD is stored, a notification on presence of printable print data PD (data presence notification) is sent via the network NW to the printer 40 that sent the authentication request.

The controller 41 of the printer 40 that has received the data presence notification causes the display unit 43 to display information for each of printable print data PD (e.g., a file name of the print data PD) specified in the data presence notification. Upon receiving a selection and a print instruction provided by the user with respect to the print data PD displayed on the display unit 43, the controller 41 sends, to the server 30 via the network NW, a print request including information specifying the selected print data PD.

In the server 30 that has received the print request, the controller 31 generates a print command based on the print data PD that is specified in the received print request, that is selected from among other print data PD stored in the storage unit 33, and that is based on the print setting information stored together with the print data PD. A print command is information in a page description language (PDL) format that the printer 40 can interpret and use to perform printing, for example. The controller 31 sends the generated print command, via the network NW, to the printer 40 that has sent the print request.

The controller 41 of the printer 40 that has received the print command in response to the print request interprets the received print command and performs printing (controls, based on the print command, and causes the printing unit that is a part of the operation unit 45 to output a print). The authentication printing that is only allowed to be performed by a registered user who is a user authenticated by the server 30, as described above, is now completed. The printer 40 may notify the server 30 of a result of printing performed based on a print command as described above.

3. CONVERSION METHOD SETTING PROCESS

Figure 2:
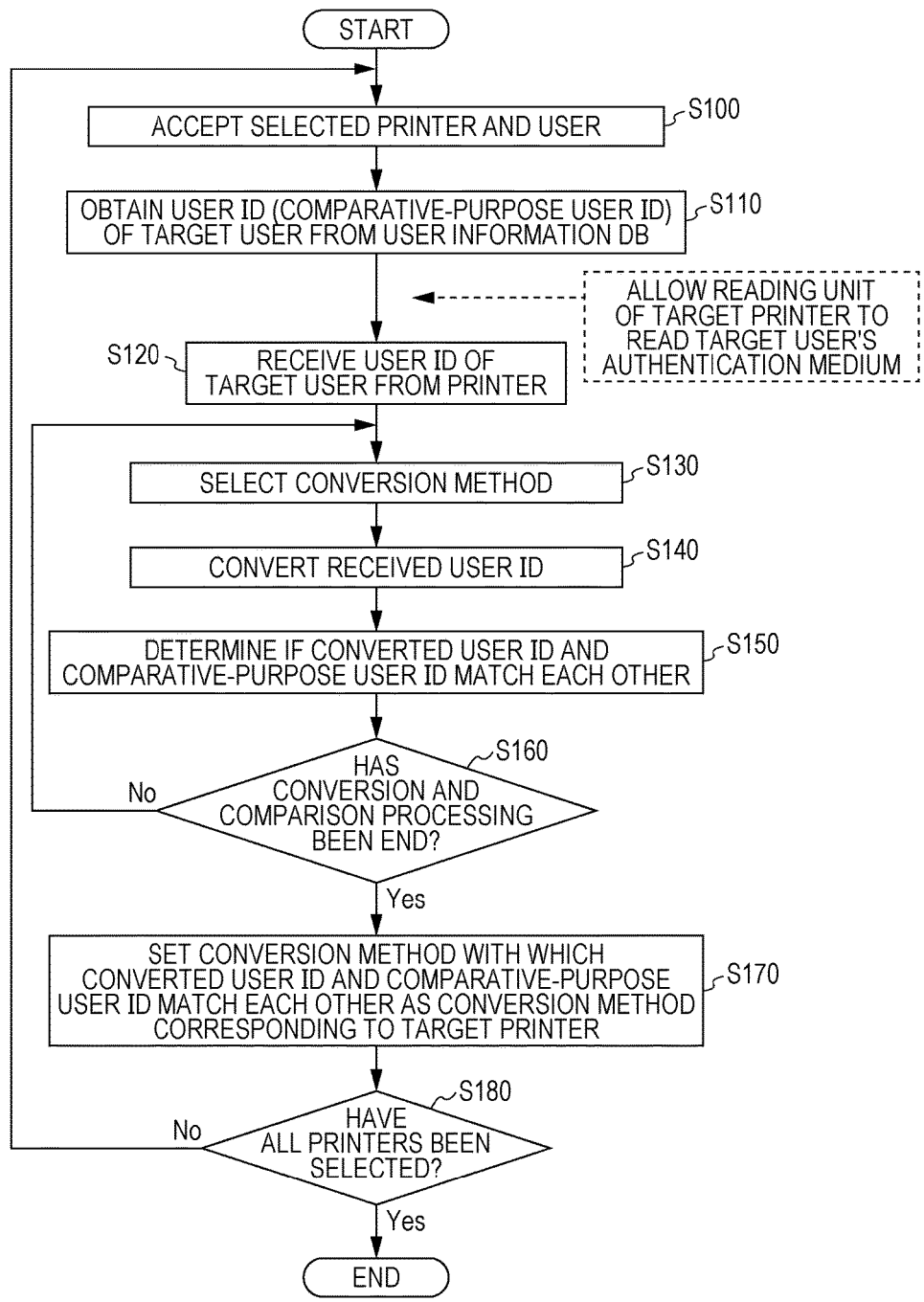
FIG. 2 is a flowchart illustrating a conversion method setting process.

FIG. 2 illustrates a flowchart of a conversion method setting process executed by the controller 31 of the server 30 in accordance with a conversion method setting program (authentication printing control program 36). For convenience, a user who controls the server 30 is referred to as an administrator. The administrator may be a registered user. The administrator operates the server 30 to cause the server 30 to execute a conversion method setting process. Operation of the server 30 may be an aspect of directly operating the server 30 through the display unit 34 and the operation input unit 35, or may be an aspect of operating via an external terminal (e.g., the client terminal 20 or another terminal) that is coupled to the server 30 and that is capable of displaying a user interface (UI) screen provided by the server 30.

The controller 31 accepts selection of the printer 40 that is subject to the conversion method setting process, as well as selection of a user who is to perform the setting process (step S100). For example, by causing the display unit 34, for example, to display the UI screen provided to select one of a plurality of printers 40 that are recognized as being present in the system 10, the controller 31 accepts from the administrator the selected printer 40, which is subject to the conversion method setting process. Through the UI screen, the controller 31 accepts from the administrator the selected registered user in the user information DB 60. For convenience, the printer 40 and the user selected in step S100 are respectively referred to as the target printer and the target user. The administrator may select himself/herself as the target user.

In step S110, the controller 31 obtains from the user information DB 60 a user ID of the specified user, i.e., the target user. For convenience, the user ID obtained in step S110 is referred to as the comparative-purpose user ID.

After selecting the target printer and the target user, the administrator allows the reading unit 46 of the target printer to read an authentication medium possessed by the target user (see the description surrounded by a broken line in FIG. 2). The controller 41 of the target printer then sends the user ID of the target user, which is received from the reading unit 46, via the network NW to the server 30 and the controller 31 receives from the target printer the user ID of the target user (step S120). In terms of receiving the user ID as described above, the communication IF 32 and the controller 31 function as a read information obtaining unit configured to obtain read information (user ID) read from the authentication medium by the reading device (reading unit 46).

Next, the controller 31 selects a format conversion method (step S130). A conversion method refers to a method of converting the format of data into another format, and is implemented as, for example, a transfer function, a conversion table, or a conversion software program. Various formats are available, including, for example, decimal numbers, hexadecimal numbers, and ASCII characters. A format of a user ID sent from the printer 40 included in the system 10 differs depending on a type of the reading unit 46. A format of a user ID when the server 30 receives the user ID from the printer 40 differs from a format of a user ID stored in the user information DB 60 of the storage unit 33. In order to correctly perform the authentication, the controller 31 has to convert the format of the user ID received from the printer 40. In the storage unit 33, for example, a plurality of different conversion methods are stored beforehand, and the controller 31 selects and obtains one of the plurality of conversion methods.

In step S140, the controller 31 uses the conversion method selected in step S130 to convert the user ID of the target user that is received in step S120. In terms of step S140, the controller 31 functions as a conversion unit configured to convert read information (user ID) in accordance with a predetermined conversion method. In terms of step S110 as described above, the controller 31 functions as an authentication information obtaining unit configured to obtain comparative-purpose authentication information (comparative-purpose user ID), which is to be compared with converted read information.

In step S150, the controller 31 determines whether the user ID converted in step S140 (converted user ID) and the comparative-purpose user ID match each other and stores the result of the determination. In step S160, the controller 31 determines whether processing in steps S130 to S150 (conversion and comparison processing) should end and proceeds to step S170 upon determining that the processing should end, or returns to step S130 upon determining that the processing should not end.

For example, in step S150, upon determining that the converted user ID and the comparative-purpose user ID match each other, immediately after, in step S160, the controller 31 determines that the conversion and comparison processing should end. Otherwise, when all of the conversion methods of the plurality of conversion methods stored in the storage unit 33 have been selected after the most recent step S100, i.e., step S130, the controller 31 determines in step S160 that the conversion and comparison processing should end. When returning to step S130 from the determination in step S160, the controller 31 selects a conversion method that has not yet been selected after the most recent step S100, from among the plurality of conversion methods stored in the storage unit 33, and then proceeds to step S140.

In step S170, the controller 31 sets the conversion method that determines in step S150 that the converted user ID and the comparative-purpose user ID match each other as a conversion method corresponding to the target printer. A conversion method corresponding to a target printer is hereinafter also referred to as a conversion method (particular conversion method) used to convert a format of a user ID read by the reading unit 46 of the target printer and sent from the target printer. In terms of steps S150 and S170, the controller 31 functions as a conversion method setting unit configured to set, when converted read information (user ID) and comparative-purpose authentication information (comparative-purpose user ID) match each other, a conversion method as a particular conversion method used to convert read information read by the reading device (reading unit 46). Since the controller 31 executes step S170 after repeating steps S130 to S160, the controller 31 converts read information (user ID) in accordance with each of the plurality of conversion methods, and sets, as a particular conversion method, one of the plurality of conversion methods, with which converted read information and comparative-purpose authentication information (comparative-purpose user ID) match each other.

Figures 3, 4:
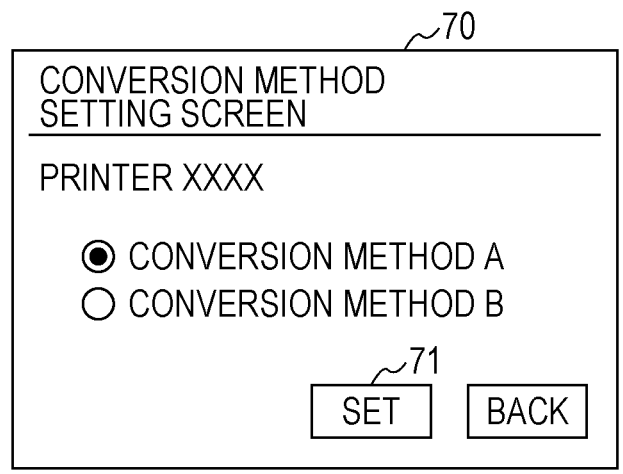
FIG. 3 illustrates an exemplary UI screen.
FIG. 4 is a table specifying relationships between printers and set conversion methods.

FIG. 3 illustrates an embodiment of an example UI screen that the controller 31 causes the display unit 34, for example, to display. The controller 31 may cause the UI screen 70 to display a conversion method that determines in step S150 that a converted user ID and a comparative-purpose user ID match each other, together with a name of a target printer, for example. By viewing the UI screen 70, the administrator is able to specifically know, when a user ID sent from the target printer is converted, the conversion method with which the result of the conversion and the comparative-purpose user ID match each other. There may be one or more conversion methods with which a converted user ID and a comparative-purpose user ID match each other. The example illustrated in FIG. 3 includes a plurality of conversion methods with which a converted user ID and a comparative-purpose user ID match each other (conversion methods A, B, . . . ). While a conversion method is selected on the UI screen 70 from among one or more conversion methods, with which a converted user ID and a comparative-purpose user ID match each other, the administrator operates a set button 71 on the UI screen 70, for example. In step S170, the controller 31 may set a conversion method selected on the UI screen 70, when the set button 71 is operated, as a conversion method corresponding to the target printer.

By allowing the administrator to confirm a conversion method to be set in association with a target printer through the UI screen 70 as described above, the administrator (user) can be prompted to select settings, in particular when there are a plurality of conversion methods that can be set in association with the target printer. According to this embodiment in which the controller 31 causes the UI screen 70 to display conversion methods, as illustrated in FIG. 3, it can be said that the server 30 includes a display controller (controller 31) configured to cause a predetermined display unit to display a conversion method with which converted read information (user ID) and comparative-purpose authentication information (comparative-purpose user ID) match each other, and a selection accepting unit (operation input unit 35 and controller 31) configured to accept a selection from among the displayed conversion methods.

In steps S100 to S170 as described above, a conversion method corresponding to one of the printers 40 (target printer), which has been selected by the administrator in step S100, is set. In step S180, the controller 31 determines whether all of the printers 40 present in the system 10 have been selected as target printers. If all of the printers 40 have not yet been selected as the target printers, step S100 is resumed. The administrator selects one of the printers 40 which has not yet been selected as a target printer. On the other hand, when all of the printers 40 present in the system 10 have been selected as the target printers, the controller 31 ends processing of the flowchart. As a result, each of the printers 40 of the system 10 is set with a corresponding conversion method.

FIG. 4 illustrates an embodiment of a conversion method set per each printer 40 as a result of a conversion method setting process. A table 80 specifies relationships between the printers 40 (printers 40*a*, 40*b*, 40*c* . . . ) and set conversion methods (conversion methods A, B . . . ). As a result of the conversion method setting process described with reference to FIG. 2, such a table, i.e., the table 80, is stored in the storage unit 33. After the table 80 has been stored, when the authentication request is received from one of the printers 40 via the network NW, the controller 31 reads, from the table 80, the conversion method set in association with the printer 40 that has sent the authentication request, applies the conversion method, and converts a format of a user ID included in the authentication request.

4. CONCLUSION

As described above, according to this embodiment, the information processor (server 30) obtains, from a target printer, read information (user ID) read from an authentication medium by a reading device (reading unit 46), converts the read information in accordance with a predetermined conversion method, and sets, when the converted read information and comparative-purpose authentication information (comparative-purpose user ID) match each other, the conversion method used for the conversion as a particular conversion method used to convert the read information (sent from the target printer) read by the reading device. Even when the format of read information received from the printer 40 is unknown, the server 30 is able to obtain, from the read information, by using the particular conversion method corresponding to the printer 40, information required for user authentication, i.e., information having a format identical to a format of a user ID of a registered user stored in the user information DB 60. As a result, the user can be correctly authenticated, as described above. Even when the reading unit 46 of the printer 40 has been replaced, or a new printer 40 has been added to the system 10, an appropriate conversion method associated with the printer 40 can be set by specifying the printer 40 as the target printer and executing the conversion method setting process.

5. MODIFICATION EXAMPLES

This embodiment is not limited to the contents described above. This embodiment can include, for example, the modification examples described below.

Modification Example 1

Figure 5:
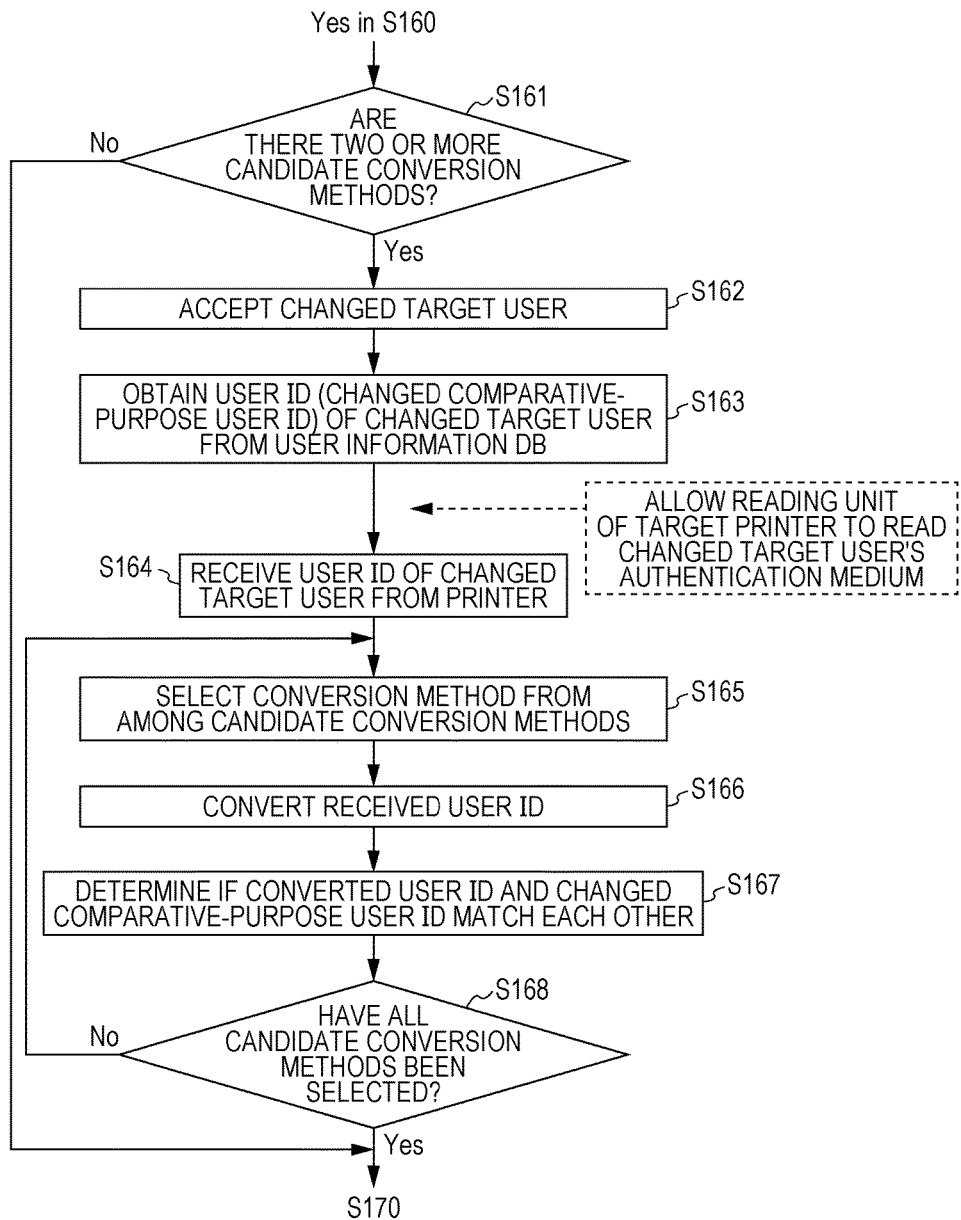
FIG. 5 is a flowchart illustrating an additional process in the conversion method setting process.

FIG. 5 illustrates a flowchart of a process added to the conversion method setting process (FIG. 2). Upon determining "Yes" in step S160 (FIG. 2), the controller 31 may execute the process illustrated in FIG. 5, which starts from step S161.

In step S161, after the most recent step S100, the controller 31 determines whether there are two or more conversion methods that determine in step S150 that a converted user ID and a comparative-purpose user ID match each other, and then proceeds to step S170 (FIG. 2) when there is only a single such conversion method, or proceeds to step S162 when there are two or more such conversion methods. In the description with reference to FIG. 5, in a plurality of conversion methods, the method with which it has been determined that a converted user ID and a comparative-purpose user ID match each other is referred to as a candidate conversion method, because the conversion methods can be candidates for a particular conversion method.

In step S162, the controller 31 accepts a different target user. In this case, the controller 31 accepts from the administrator, via the UI screen, selection of another registered user who is distinct from the currently selected target user. The user selected in step S162 is referred to as a changed target user. In step S163, the controller 31 obtains from the user information DB 60 the user ID of the changed target user. The user ID obtained in step S163 is referred to as a changed comparative-purpose user ID.

The administrator allows the reading unit 46 of the target printer to read an authentication medium possessed by the changed target user (see the description surrounded by a broken line in FIG. 5). The controller 41 of the target printer then sends the user ID of the changed target user, which is received from the reading unit 46, via the network NW to the server 30, and the controller 31 receives from the target printer the user ID of the changed target user (step S164).

Next, the controller 31 selects a format conversion method from among the candidate conversion methods (step S165). In step S166, the controller 31 then uses the candidate conversion method selected in step S165 to convert the user ID of the changed target user, which is received in step S164. In step S167, the controller 31 determines whether the user ID converted in step S166 and the changed comparative-purpose user ID match each other and stores a result of the determination. In step S168, the controller 31 determines whether all of the candidate conversion methods have been selected in step S165 and proceeds to step S170 (FIG. 2) when all of the candidate conversion methods have been selected. On the other hand, when all of the candidate conversion methods have not yet been selected in step S165, step S165 is resumed to select one of the candidate conversion methods that has not yet been selected.

The controller 31 proceeds from step S168 to step S170 (FIG. 2) and, in step S170, the controller 31 sets as a conversion method corresponding to the target printer the conversion method (one of the candidate conversion methods) that determines in step S167 that the user ID converted in step S166 and the changed comparative-purpose user ID match each other. In Modification example 1, the controller 31 may also cause the display unit 34, for example, to display the UI screen 70, and may accept from the administrator a final confirmation (selection) of the set conversion method.

As described above, when there are a plurality of conversion methods (candidate conversion methods) with which converted read information (converted user ID) and comparative-purpose authentication information (comparative-purpose user ID) match each other ("Yes" in step S161), the controller 31 converts, in accordance with each of a plurality of candidate conversion methods, newly obtained read information (user ID of the changed target user) (steps S164 to S166), obtains new comparative-purpose authentication information (changed comparative-purpose user ID) (step S163), determines that information converted from the new read information and the new comparative-purpose authentication information match each other (step S167), and identifies a particular conversion method from among the plurality of candidate conversion methods (step S170). In other words, by using a combination of a user ID of a registered user, which is stored in the user information DB 60 (comparative-purpose user ID), and an authentication medium possessed by the user to attempt setting of a conversion method with respect to a target printer, and by repeating the same process by using a combination of a user ID of another registered user and an authentication medium if no conversion method can be identified, a conversion method that is to be associated with the target printer can be identified (the number of conversion methods might not decease accordingly). Even when there are a plurality of conversion method candidates for a particular conversion method, an appropriate conversion method selected from among the plurality of conversion methods can therefore be set as the particular conversion method.

Modification Example 2

Described so far are prerequisite configurations in which the reading unit 46 is attached externally to the printer 40, and a user ID read from an authentication medium by the reading unit 46 is sent from the reading unit 46, via the printer 40, to the server 30. In other words, from the viewpoint of the server 30, the sender of the user ID is the printer 40. In this embodiment, however, the reading unit 46 may send a user ID read from an authentication medium directly to the server 30, without going through the printer 40. Even in this case, the controller 31 of the server 30 should have, as prerequisite information, a one-to-one relationship between each of the reading units 46 (reading devices) and a corresponding one of the printers 40. Upon receiving a user ID from one of the reading units 46, the controller 31 refers to the relationships, determines that the received user ID has been sent from one of the printers 40, which corresponds to the reading unit 46 that has sent the user ID, executes the conversion method setting process (e.g., FIG. 2), and controls authentication printing.

Modification Example 3

In step S180 in FIG. 2, when there are a plurality of printers 40 included in the system 10, the controller 31 of the server 30 selects each of the printers 40 one by one as a target printer and repeatedly executes the conversion method setting process (steps S100 to S170). In this case, the controller 31 sets a conversion method to a first one of the printers 40, and, when executing the conversion method setting process for second and subsequent printers 40, in step S130, the controller 31 first selects the conversion method that has been set in association with the first one of the printers 40.

Since some of the reading units 46 of the printers 40 included in the system 10 are highly likely to include readers with an identical specification (of an identical type), when executing the conversion method setting process for the second and subsequent printers 40, by first selecting the conversion method that has been set, in step S130, in association with the first one of the printers 40, a conversion method with which the converted user ID and a comparative-purpose user ID match each other will thus highly likely be determined by executing steps S130 to S150 only once. In a configuration in which it will be determined that conversion and comparison processing should end in step S160 immediately after step S150, in which it is determined that a converted user ID and a comparative-purpose user ID match each other, the conversion method setting process can effectively proceed for second and subsequent printers 40.

The entire disclosure of Japanese Patent Application No. 2017-006464, filed Jan. 18, 2017 is expressly incorporated by reference herein.

What is claimed is:

1. A networked computer system that facilitates printing operations by authenticating a user prior to performing those printing operations, the networked computer system comprising:

a multifunction machine that is structured to at least perform a printing operation on a medium, the multifunction machine connecting to a reading device configured to receive credentials of the user, the credentials being used to authenticate the user with the networked computer system in order to perform the printing operation; and a server computer system, wherein the server computer system is in communication with the multifunction machine and is configured to at least partially control operations of the multifunction machine, including the printing operation, the server computer system comprising:

a processor configured to:

obtain read information read from an authentication medium by the reading device of the multifunction machine;

convert the read information in accordance with a selected conversion method, wherein the selected conversion method is one of a plurality of candidate conversion methods, and wherein selecting the selected conversion method is performed by the following selection method:

selecting a first candidate conversion method included within the plurality of candidate conversion methods;

converting the read information using the first candidate conversion method and performing a comparison between the converted read information and comparative-purpose authentication information; and if a match is identified as a result of the comparison, selecting the first candidate conversion method as the selected conversion method, but if the match is not identified, repeating the selection method using a different candidate conversion method included within the plurality of candidate conversion methods until the match is identified;

to obtain the comparative-purpose authentication information that is used for the comparison with the read information after the read information is converted; and to set, when the converted read information and the comparative-purpose authentication information match each other, the selected conversion method as a particular conversion method to be used to convert the read information read by the reading device.

2. The information processor according to claim 1, wherein the processor regards authentication information associated with a specified user as the comparative-purpose authentication information.

3. The information processor according to claim 1, further comprising: a display controller configured to cause a predetermined display unit to display conversion methods with which the converted read information and the comparative-purpose authentication information match each other; and wherein the processor configured to accept a selection from among the displayed conversion methods, wherein the processor sets the selected conversion method as the particular conversion method.

4. A networked computer system that facilitates printing operations by authenticating a user prior to performing those printing operations, the networked computer system comprising:

a multifunction machine that is structured to at least perform a printing operation on a medium, the multifunction machine connecting to a reading device configured to receive credentials of the user, the credentials being used to authenticate the user with the networked computer system in order to perform the printing operation;

a client terminal configured to communicate with the multifunction machine to initialize the printing operation; and a server computer system, wherein the server computer system is in communication with the multifunction machine and is configured to at least partially control operations of the multifunction machine, including the printing operation, the server computer system comprising:

a read information obtaining function that obtains read information read from an authentication medium by the reading device of the multifunction machine;

a conversion function that converts the read information in accordance with a selected conversion method, wherein the selected conversion method is one of a plurality of candidate conversion methods, and wherein selecting the selected conversion method is performed by the following selection method:

selecting a first candidate conversion method included within the plurality of candidate conversion methods;

converting the read information using the first candidate conversion method and performing a comparison between the converted read information and comparative-purpose authentication information; and if a match is identified as a result of the comparison, selecting the first candidate conversion method as the selected conversion method, but if the match is not identified, repeating the selection method using a different candidate conversion method included within the plurality of candidate conversion methods until the match is identified;

an authentication information obtaining function that obtains the comparative-purpose authentication information to be used for the comparison with the read information after the read information is converted; and a conversion method setting function that sets, when the converted read information and the comparative-purpose authentication information match each other, the selected conversion method as a particular conversion method to be used to convert the read information read by the reading device.

* * * * *